H. P. BALL.
ELECTRIC COOKING DEVICE.
APPLICATION FILED NOV. 26, 1912.

1,118,392. Patented Nov. 24, 1914.

Witnesses:
Irving E. Steus.
J. Ellis Glen

Inventor
Henry Price Ball,
by Albert G. Davis
His Attorney

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

ELECTRIC COOKING DEVICE.

1,118,392.

Specification of Letters Patent.  Patented Nov. 24, 1914.

Application filed November 26, 1912. Serial No. 733,611.

*To all whom it may concern:*

Be it known that I, HENRY PRICE BALL, a citizen of the United States, residing at Pittsfield, county of Berkshire, State of Massachusetts, have invented certain new and useful Improvements in Electric Cooking Devices, of which the following is a specification.

My invention relates to electric cooking devices and more particularly to such devices which are suitable for cooking vegetables and for other operations which must be continued for a considerable time at a comparatively low temperature and to the combination of such devices with the other devices required to constitute an electric cooking range.

One object of my invention is to provide an efficient and economical cooking device of the aforesaid character and one which will be conveniently located with reference to the other portions of the cooking range.

A further object of my invention is to provide means for utilizing any heat which may be developed in the said device in excess of that necessary for the cooking operation performed therein.

According to my invention I embody in the range a heat insulated cooking pocket which is located below the top surface thereof. In order that other parts of the range which are used more frequently may be conveniently located in the front of the range, I prefer to locate the aforesaid pocket in the rear portion thereof. The heating means for the said pocket may be any well known electric heating device. In case the pocket forms part of a range of the type in which the current is turned on only at such times as the range is in use and known as the "intermittent" type as distinguished from the "storage" type, the heating means may be an electrical resistance stove such as that disclosed in Logan Patent #957,226. In case the pocket is used in connection with electrical heat storage ranges of the character disclosed in Stanley Patent #1,025,843 an electrical heat storage mass may constitute said means, the cooking pockets being located in close thermal conductive relation thereto.

My invention will be more clearly understood by referring to the accompanying drawing in which—

Figure 1:
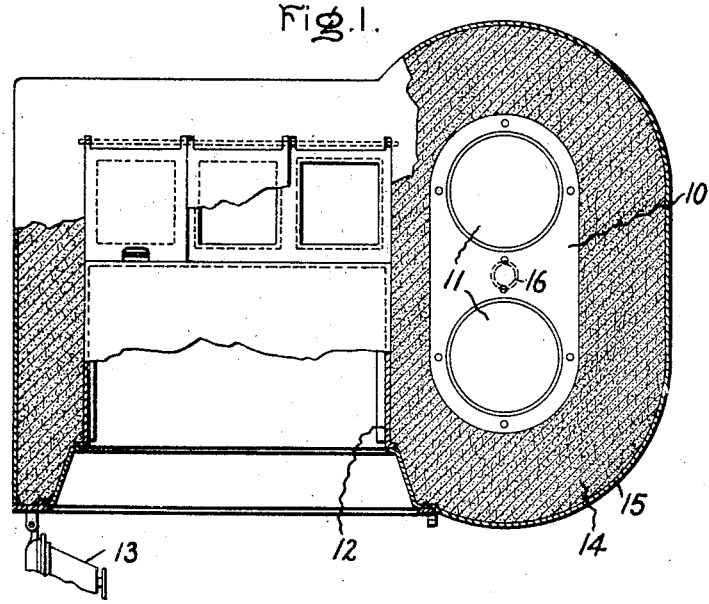
Figure 2:
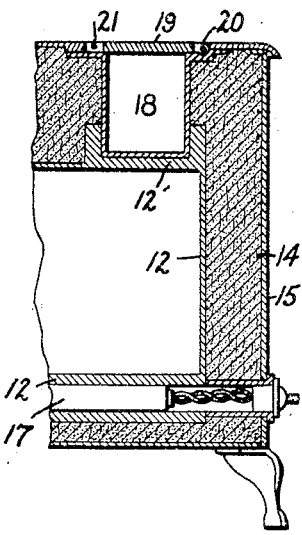
Figure 3:
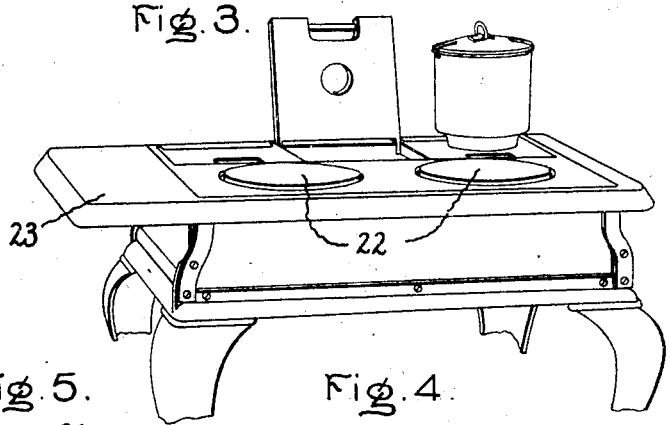
Figure 4:
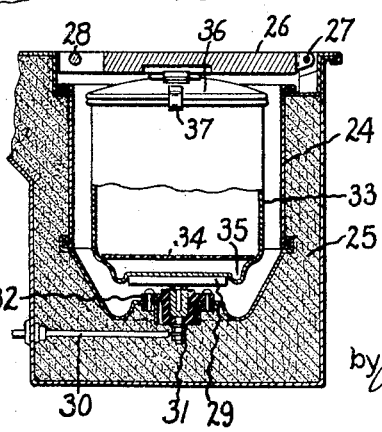

Figure 1 is a plan view partially broken away; Fig. 2 is a partial vertical section of my invention as applied to an electrical heat storage range; Fig. 3 is a partial perspective view of an intermittent electric cooking range embodying my invention; Fig. 4 is a vertical section of a vegetable cooking pocket forming part of the same; and Fig. 5 is a partial vertical section of a cooking receptacle.

In Figs. 1 and 2 is shown a portion of an electrical heat storage range of the character disclosed in Stanley Patent #1,025,843 which comprises a heat storage mass 10 provided with stoves 11 and the storage oven 12 having a suitable door 13. The aforesaid parts are inclosed by insulation 14 and casing 15. The heating means comprises the cartridge resistance units 16 and 17. The oven 12 is composed of cast iron or other material having high heat storage capacity and the rear portion 12' of the top thereof is preferably of somewhat greater thickness than the other portions so as to concentrate the heat storage around the vegetable cooking pockets 18 which are held thereby. The casings of said pockets 18 are preferably of metal such as iron and of such thickness that they will have a certain amount of heat storage capacity. The top of each of the vegetable cooking pockets has attached thereto a cover 19 which may be hinged at the rear as at 20. The said top is preferably of iron and of suitable thickness so as to constitute a heat storage mass of considerable capacity. A handle 21 is preferably set below the top surface of the said lid. The vegetable cooking pocket 18 is adapted to receive any suitable receptacle for containing vegetables or other articles desired to be cooked. Owing to the fact that the pocket is located below the top surface of the range it obtains the benefit of the heat insulation of the range as a whole. The cover 19 will be heated by the steam which escapes from the cooking utensil and by heat conducted and radiated from the storage mass and will serve as a hot plate. Owing to the fact that there are no projections above the top of the range, various cooking utensils may be easily slid to the back part of the range into contact with the hot plates and out of the way.

In Figs. 3 and 4 I have shown my invention as applied to an intermittent electrical cooking range. This may be provided with stoves 22 mounted in the front portion of the top thereof. These stoves may be of any well known construction such as that disclosed in the Logan patent hereinbefore referred to, and *per se* constitute no part of my invention. In the rear portion of the top 23 of the aforesaid range are located vegetable cooking pockets embodying my invention. As shown in Fig. 4, these pockets comprise inner and outer metallic shells 24 between which is packed any suitable heat insulation 25. Cover 26 hinged at 27 provided with handle 28 and otherwise similar in all respects to the cover 19 hereinbefore described, is provided for said pocket. In the bottom of the pocket is mounted the flat electrical resistance heating unit 29 which may be similar to that disclosed in the Logan patent hereinbefore referred to. Suitable electric connections 30 are provided between the said stove and an external supply circuit. The terminal connection 31 of the stove and conductor 30 may be mounted in an insulating bushing 32.

Figure 5:
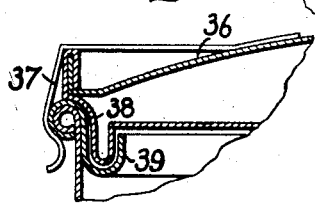

I have shown in Figs. 3, 4 and 5 one form of receptacle 33 which may be used for operations such as cooking vegetables in connection with either form of my invention. The said receptacle has mounted in the bottom therein and spaced somewhat from the bottom thereof, a screen or grating 34 on which the vegetables may be placed. Below the said grating the receptacle is adapted to contain a quantity of water as at 35. The receptacle 33 may be provided with suitable cover 36 which may be held in place by the spring clamps 37. As shown in Fig. 5, the said receptacle is provided with a water seal to reduce to a minimum the steam escaping therefrom. The said water seal comprises the downwardly extending flange 38 on the cover 36 which projects into the annular trough 39 supported at the top of the receptacle proper.

In the modification shown in Figs. 3 and 4, my vegetable cooking pocket is heated by means of the intermittent electric resistance stove 29. The cover 26 will be heated by any steam rising from the vegetable receptacle and also by heat conducted and radiated from the stove 29. In this form as well as in the form applied to the storage range the cover for the vegetable cooking pocket is adapted to serve as a hot plate. Cooking utensils after being heated by means of the stoves 22 may be slid back upon the said cover plates and kept warm for considerable time. Owing to the effective heat insulation practically all of the heat liberated by the unit 29 will be utilized, thus producing a very efficient and economical device.

Various modifications of the above described structure will readily suggest themselves to those skilled in the art and are to be considered as coming within the scope of my invention which is set forth in the following claims.

What I claim as new and desire to secure by Letters Patent of the United States, is,—

1. In an electrically heated range, one or more heaters located in the front of the range, a plurality of heat insulated cooking pockets located in the rear thereof and below the top surface of the same, lids for said pockets substantially flush with the top surface of the said range and having considerable heat storage capacity and means for supplying heat to said pockets.

2. In an electrically heated range, a cooking pocket located below the top surface thereof, a lid for said pocket having considerable heat storage capacity substantially flush with the top of the said range and means for heating said pocket.

3. In an electrically heated range, a heat insulated cooking pocket located below the top surface thereof, a lid for said pocket having considerable heat storage capacity and means for supplying heat to the said pocket.

4. In an electrically heated range, a storage oven, a casing forming a cooking pocket located below the top of said range and in close thermal conductive relation to said storage oven, a portion of the top of said oven adjacent to said pocket being of greater thickness than the other portions thereof.

In witness whereof, I have hereunto set my hand this 21st day of November, 1912.

HENRY PRICE BALL.

Witnesses:
  H. B. DAVERIN,
  M. J. REYNOLDS.

Copies of this patent may be obtained for five cents each, by addressing the "Commissioner of Patents, Washington, D. C."